(12) United States Patent
Dawson et al.

(10) Patent No.: US 8,595,566 B2
(45) Date of Patent: Nov. 26, 2013

(54) ERROR TRACKING METHOD AND SYSTEM

(75) Inventors: Colin S. Dawson, Tucson, AZ (US);
Glen Hattrup, Tucson, AZ (US);
Howard N. Martin, Tucson, AZ (US);
David M. Morton, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/609,204

(22) Filed: Sep. 10, 2012

(65) Prior Publication Data
US 2013/0006937 A1 Jan. 3, 2013

Related U.S. Application Data

(63) Continuation of application No. 13/053,013, filed on Mar. 21, 2011, now Pat. No. 8,347,151, which is a continuation of application No. 11/563,583, filed on Nov. 27, 2006, now Pat. No. 7,937,627, which is a continuation of application No. 10/686,087, filed on Oct. 15, 2003, now Pat. No. 7,181,647.

(51) Int. Cl.
*G06F 11/00* (2006.01)

(52) U.S. Cl.
USPC .................................. 714/54; 714/6.1; 714/42

(58) Field of Classification Search
USPC .............................................. 714/54, 42, 6.1
See application file for complete search history.

(56) References Cited

U.S. PATENT DOCUMENTS

| | | |
|---|---|---|
| 4,697,234 A | 9/1987 | Spillar et al. |
| 4,750,175 A | 6/1988 | Brenneman et al. |
| 4,964,125 A | 10/1990 | Kim |
| 5,127,005 A | 6/1992 | Oda et al. |
| 5,319,775 A | 6/1994 | Loges et al. |
| 5,367,667 A | 11/1994 | Wahlquist et al. |
| 5,426,284 A | 6/1995 | Doyle |

(Continued)

FOREIGN PATENT DOCUMENTS

| | | |
|---|---|---|
| JP | 9083516 | 3/1997 |
| JP | 10143484 | 5/1998 |

OTHER PUBLICATIONS

Office Action dated Dec. 12, 2011 pp. 1-20 for U.S. Appl. No. 13/053,013, filed Mar. 21, 2011 by inventors Colin S. Dawson et al.

(Continued)

*Primary Examiner* — Loan L. T. Truong
(74) *Attorney, Agent, or Firm* — David W. Victor; Konrad, Raynes, Davda & Victor LLP

(57) ABSTRACT

Data storage services are provided for clients for backup of data objects from the clients. A data object is sent to a first location in a first storage device. A determination is made if the data object was successfully stored at the first location, and if so, meta data corresponding with the data object is stored, wherein the meta data includes first path information on a first data path of the data object to the first location. The data object is migrated from the first location to a second location in a second storage device. A determination is made if the data object was successfully stored at the second location, and if so, second path information on a second data path of the data object is added to the second location to the meta data corresponding with the data object, to update the meta data.

18 Claims, 4 Drawing Sheets

(56) References Cited

U.S. PATENT DOCUMENTS

| | | | |
|---|---|---|---|
| 5,463,768 A | 10/1995 | Cuddihy et al. | |
| 5,586,311 A * | 12/1996 | Davies et al. | 715/764 |
| 5,619,621 A | 4/1997 | Puckett | |
| 5,678,042 A | 10/1997 | Pisello et al. | |
| 5,712,972 A | 1/1998 | Kakkar | |
| 5,799,148 A | 8/1998 | Cuddihy et al. | |
| 6,023,710 A | 2/2000 | Steiner et al. | |
| 6,269,083 B1 | 7/2001 | Nagata et al. | |
| 6,311,213 B2 * | 10/2001 | Dawson et al. | 709/217 |
| 6,338,150 B1 | 1/2002 | Johnson et al. | |
| 6,401,219 B1 | 6/2002 | Shigeta | |
| 6,516,427 B1 | 2/2003 | Keyes et al. | |
| 6,530,041 B1 | 3/2003 | Furusawa et al. | |
| 6,601,210 B1 | 7/2003 | Kagan | |
| 6,732,124 B1 | 5/2004 | Koseki et al. | |
| 6,871,312 B2 | 3/2005 | Hatley | |
| 6,904,544 B2 | 6/2005 | DeRolf et al. | |
| 6,931,564 B2 | 8/2005 | Goodman et al. | |
| 7,017,084 B2 | 3/2006 | Ng et al. | |
| 7,051,240 B2 | 5/2006 | Manley et al. | |
| 7,065,619 B1 | 6/2006 | Zhu et al. | |
| 7,072,898 B2 | 7/2006 | Bussler et al. | |
| 7,082,553 B1 | 7/2006 | Wang | |
| 7,131,050 B2 * | 10/2006 | Holt | 714/763 |
| 7,181,647 B2 | 2/2007 | Dawson et al. | |
| 7,228,306 B1 * | 6/2007 | Altman et al. | 1/1 |
| 7,356,576 B2 * | 4/2008 | Rabe | 709/221 |
| 7,379,978 B2 | 5/2008 | Anderson et al. | |
| 7,412,464 B2 * | 8/2008 | Fienblit et al. | 1/1 |
| 7,500,246 B2 | 3/2009 | Saake et al. | |
| 7,577,667 B2 | 8/2009 | Hinshaw et al. | |
| 7,685,126 B2 | 3/2010 | Patel et al. | |
| 8,200,924 B2 * | 6/2012 | Sandorfi et al. | 711/162 |
| 2001/0013059 A1 * | 8/2001 | Dawson et al. | 709/217 |
| 2001/0015844 A1 * | 8/2001 | Takehana | 359/179 |
| 2001/0050903 A1 | 12/2001 | Vanlint | |
| 2002/0104039 A1 | 8/2002 | DeRolf et al. | |
| 2003/0014605 A1 | 1/2003 | Slater | |
| 2003/0061550 A1 | 3/2003 | Ng et al. | |
| 2003/0065901 A1 * | 4/2003 | Krishnamurthy | 711/170 |
| 2003/0120980 A1 | 6/2003 | Harris | |
| 2003/0135514 A1 | 7/2003 | Patel et al. | |
| 2003/0145248 A1 * | 7/2003 | McNeil | 714/13 |
| 2003/0163777 A1 | 8/2003 | Holt | |
| 2003/0217140 A1 | 11/2003 | Burbeck et al. | |
| 2004/0044941 A1 | 3/2004 | Hatley | |
| 2004/0049695 A1 | 3/2004 | Choi et al. | |
| 2004/0153719 A1 * | 8/2004 | Achiwa et al. | 714/5 |
| 2004/0201751 A1 * | 10/2004 | Bell et al. | 348/231.99 |
| 2004/0215569 A1 | 10/2004 | Agha et al. | |
| 2004/0230885 A1 | 11/2004 | Newcombe et al. | |
| 2004/0243775 A1 * | 12/2004 | Coulter et al. | 711/162 |
| 2004/0260726 A1 * | 12/2004 | Hrle et al. | 707/104.1 |
| 2005/0038968 A1 * | 2/2005 | Iwamura et al. | 711/162 |
| 2005/0050115 A1 | 3/2005 | Kekre | |
| 2005/0050468 A1 * | 3/2005 | Cheng et al. | 715/530 |
| 2005/0081089 A1 * | 4/2005 | Hayardeny et al. | 714/6 |
| 2007/0100879 A1 | 5/2007 | Dawson et al. | |

OTHER PUBLICATIONS

Response to Office Action dated Mar. 12, 2012, pp. 1-12, for U.S. Appl. No. 13/053,013, filed Mar. 21, 2011 by inventors Colin S. Dawson et al.

Notice of Allowance dated Aug. 16, 2012, pp. 1-17, for U.S. Appl. No. 13/053,013, filed Mar. 21, 2011 by inventors Colin S. Dawson et al.

"Error Symptom Code Generator for a Storage System", IBM Technical Disclosure Bulletin, Aug. 1972, pp. 799, 800, 800a, vol. 15 No. 3, IBM Corp.

First Office Action for U.S. Appl. No. 10/686,087, dated Jul. 3, 2006, 25 pgs.

Notice of Allowance for U.S. Appl. No. 10/686,087, dated Oct. 10, 2010, 3 pgs.

Response to First Office Action for U.S. Appl. No. 10/686,087, dated Sep. 7, 2006, 7 pgs.

First Office Action for U.S. Appl. No. 11/563,583, dated Jan. 7, 2009, 24 pgs.

Final Office Action for U.S. Appl. No. 11/563,583, dated Aug. 20, 2009, 15 pgs.

First Notice of Allowance for U.S. Appl. No. 11/563,583, dated Feb. 24, 2010, 7 pgs.

Second Notice of Allowance for U.S. Appl. No. 11/563,583, dated Dec. 29, 2010, 11 pgs.

Response to First Office Action for U.S. Appl. No. 11/563,583, dated May 7, 2009, 16 pgs.

Response to Final Office Action for U.S. Appl. No. 11/563,583, dated Nov. 20, 2009, 14 pgs.

Response After Notice of Allowance for U.S. Appl. No. 11/563,583, dated Apr. 27, 2010, 13 pgs.

* cited by examiner

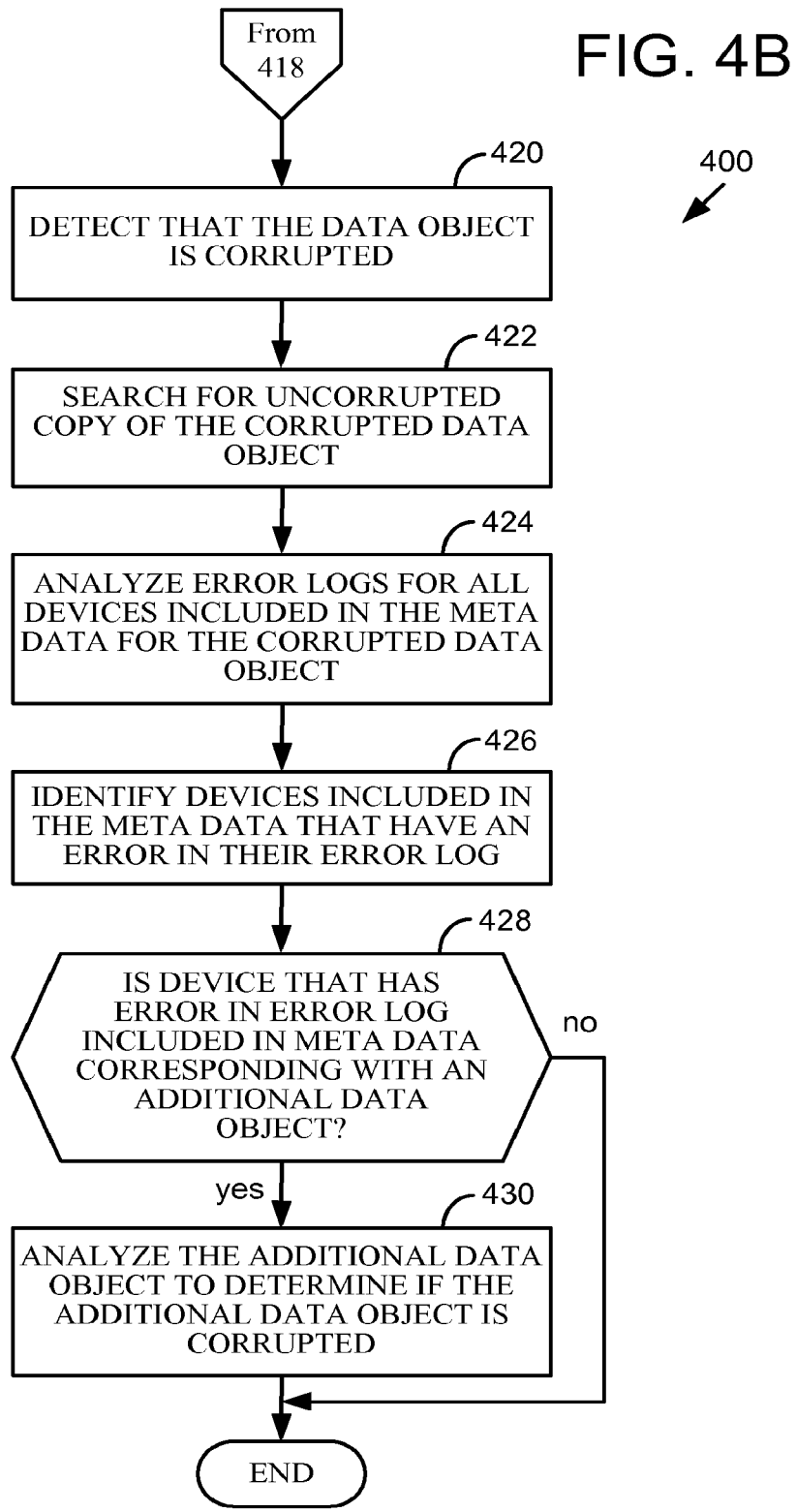

ERROR TRACKING METHOD AND SYSTEM

CROSS-REFERENCE TO RELATED APPLICATIONS

This application is a continuation of U.S. patent application Ser. No. 13/053,013, filed on Mar. 21, 2011, which is a continuation of U.S. Pat. No. 7,937,627, issued on May, 3, 2011, which is a continuation of U.S. Pat. No. 7,181,647, issued on Feb. 20, 2007, which patent application and patents are incorporated herein by reference in their entirety.

BACKGROUND

1. Technical Field

The present invention relates to identifying defective components in a computing system. More particularly, the invention concerns storing information concerning the paths of data objects in a computing system to facilitate identifying defective components.

2. Description of Related Art

Important data is frequently stored in computing systems. If a data object becomes corrupted, it is desirable to be able to quickly identify the cause of the data corruption, so the problem can be eliminated. A problem may be eliminated, for example, by replacing a defective component. Quickly identifying and replacing defective components can limit the amount of corrupted data and associated costs. The task of identifying the cause of data corruption is particularly challenging in computing systems that utilize a large number of storage devices, and which have a large number of paths over which data objects may travel, such as when a storage area network (SAN) is utilized.

Utilizing a storage area network increases the complexity of a computing system. When a data object is stored in a storage area network, the data path is rarely a simple point-to-point transfer, and instead, may involve multiple interfaces and devices. Consequently, a data object may travel over any of a number of paths between a source and a destination when being stored. In this case, when an error is detected in stored data, it is often difficult to determine the cause of the error. Computing environments of directly attached storage also suffer from similar problems.

One traditional method of error tracking involves examining information that devices in a computing system provide for diagnosing problems. For example, device logs may be examined to try to identify one or more devices that have experienced an error, and to try to identify the type of error that has occurred. Server error reports may also be examined. One problem with this technique is that an error investigation may take place after the error has been flushed from the relevant error logs, and consequently the error cannot be determined. Also, even if a device that has experienced an error is identified, it is often difficult to determine whether the path of a particular data object included the device that experienced the error.

It is difficult and time consuming to examine every device in a storage area network or large network of locally attached devices. The number of devices connected to a storage area network may be large, and the number of possible connections between devices increases exponentially as the number of storage devices increases.

Consequently, with large storage area networks, examining error logs, and determining when or if a device handled a data object is a daunting, if not impossible task. The difficulty is compounded in heterogeneous computing environments. Frequently, storage management software is erroneously blamed for data errors.

Cyclical Redundancy Checking (CRC) is another known technique for error detection. However, the usefulness of utilizing CRC checking for error detection is limited because many computing environments cannot tolerate the performance cost of CRC techniques at each transfer. Additionally, CRC checking facilitates identifying only a limited set of devices in the data path of a data object for further investigation.

In another known technique for error tracking, devices in a storage area network are relied upon to report data transfer errors to a storage manager server, so the server can notify a client to retry an operation if necessary. However, the success of this technique is dependent on errors being reliably reported to the server, which often does not occur. For example, a defective device itself may not detect an error, and therefore will not make an entry in its error log, and will not report the error to the server or a calling application. Examples of undetected errors that devices may fail to report include flipped bits and the failure to store a file.

In addition to the factors discussed above, traditional error tracking methods are often inadequate when data storage errors are intermittent and are associated with individual data objects, which is frequently the case. In summary, known error tracking techniques are generally inadequate for quickly and accurately identifying malfunctioning components in a computing system.

SUMMARY

One aspect of the invention is a method for error tracking. An example of the method includes sending a data object to a first location. This example of the method also includes determining if the data object was successfully stored at the first location, and if so, storing meta data corresponding with the data object, wherein the meta data includes first path information. This example of the method also includes sending the data object to a second location. This example of the method further includes determining if the data object was successfully stored at the second location, and if so, adding second path information to the meta data corresponding with the data object, to update the meta data. A direct effect of some examples of this method is the establishment of a history of devices that have handled a data object.

Other aspects of the invention are described in the sections below, and include, for example, a computing system, and a signal bearing medium tangibly embodying a program of machine-readable instructions executable by a digital processing apparatus to perform a method for error tracking.

The invention provides a number of advantages. For example, some examples of the invention permit quickly identifying defective components that have caused data errors in a computing system. Additionally, some examples of the invention provide the benefit of identifying data that may have been corrupted by defective components. The invention also provides a number of other advantages and benefits, which should be apparent from the following description.

BRIEF DESCRIPTION OF THE DRAWINGS

FIGS. 4A and 4B are a flowchart of an operational sequence for error tracking in accordance with an example of the invention.

DETAILED DESCRIPTION

The nature, objectives, and advantages of the invention will become more apparent to those skilled in the art after considering the following detailed description in connection with the accompanying drawings.

I. Hardware Components and Interconnections

Figure 1:
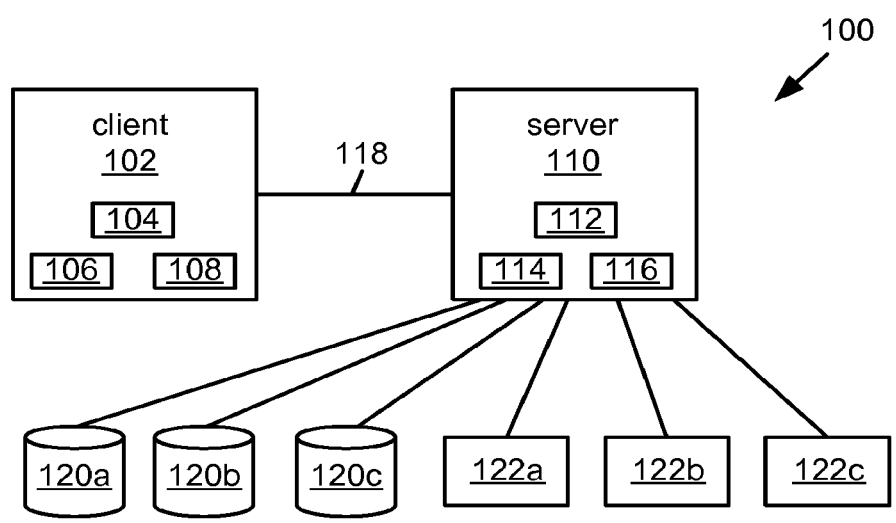
FIG. 1 is a block diagram of the hardware components and interconnections of a computing system in accordance with an example of the invention.

One aspect of the invention is a computing system that can be used for error tracking As an example, the computing system may be embodied by all, or portions of, the computing system 100 shown in FIG. 1. The computing system 100 includes a client computer 102. More than one client 102 could be included. The client 102 may run any suitable operating system, for example, Windows 2000, AIX, Solaris™, Linux, UNIX, or HP-UX™. The client 102 may be implemented on any suitable computing device, for example a personal computer, a workstation, a mainframe computer, or a supercomputer.

The client 102 has a processor 104 (which may be called a processing device), and in some examples could have more than one processor. As an example, the processor 104, may be a PowerPC RISC processor, available from International Business Machines Corporation. In another example, the processor could be a processor manufactured by Intel Corporation. The client 102 also may have a storage that may include a primary memory 106 (for example RAM), and/or a non-volatile memory 108, both of which are coupled to the processor 104. The storage may be used to store data and application programs and/or other programming instructions executed by the processor 104. The application programs could generally be any suitable applications. The non-volatile memory 108 could be, for example, a hard disk drive, a drive for reading and writing from optical or magneto-optical media, a tape drive, non-volatile RAM (NVRAM), or any other suitable type of storage. In some examples the primary memory 106 or the non-volatile memory 108 could be eliminated, or the primary memory 106 and/or the non-volatile memory 108 could be provided on the processor 104, or alternatively, external from the client 102.

The computing system 100 also includes a server computer 110. More than one server 110 may be included. As an example, the server 110 could be a personal computer (having for example, an Intel processor running the Windows or Linux operating system), a computer workstation, a mainframe computer, a supercomputer (for example an IBM SP2 running the AIX operating system), or any other suitable computing device running any suitable operating system. As another example, the server 110 could be an IBM xSeries server. In another example, the server 110 could be an IBM zSeries Parallel Sysplex server, such as a zSeries 900, running the z Operating System (z/OS). In another example, the server 110 could be an IBM S/390 server running OS/390.

The server 110 has a processor 112 (which may be called a processing device), and in some examples could have more than one processor. As an example, the processor 112, may be a PowerPC RISC processor, available from International Business Machines Corporation. In another example, the processor could be a processor manufactured by Intel Corporation. In one specific example, the server 110 could use an IBM P690 power 4 processor, running the AIX operating system and Tivoli Storage Manager (TSM), all of which are available from IBM Corporation. The server may also have a storage, which may include a primary memory 114 (for example RAM), and/or a non-volatile memory 116, both of which are coupled to the processor 112. The storage may be used to store data and application programs and/or other programming instructions executed by the processor 112. The programs could generally be any suitable programs, and could include for example, DB2, Oracle, or custom applications. The non-volatile memory 116 could be, for example, a hard disk drive, a drive for reading and writing from optical or magneto-optical media, a tape drive, non-volatile RAM (NVRAM), or any other suitable type of storage. In some examples the primary memory 114 or the non-volatile memory 116 could be eliminated, or the primary memory 114 and/or the non-volatile memory 116 could be provided on the processor 112, or alternatively, external from the server 110. The server 110 is coupled to the client 102 over a connection 118, which may be for example, an ESCON or ETHERNET connection, and as an example, may be an IP network.

The server 110 may manage data backup operations, and store file system meta-data, for example, data object path information that may include dates and times that a data object is stored, source identifiers, and destination identifiers. The meta-data may also include a file creation time and file security information.

The computing system 100 also includes at least one storage device. As an example, a plurality of storage devices may be directly coupled to the server 110 as shown in FIG. 1. The plurality of storage devices may include, for example, hard drives 120a-c, and tape drives 122a-c. Each of the storage devices in the plurality of storage devices could be implemented with any suitable type of storage device, using any suitable technology, such as magnetic, optical, magneto-optical, or electrical. For example, suitable storage devices could include hard disk drives, optical disks or discs (for example, CD-RW, DVD-RW, or DVD+RW), floppy disks, magnetic data storage disks or diskettes, magnetic tape, digital optical tape, a tape library, EPROMs, EEPROMs, RAM, Non-Volatile RAM, and flash memory. Additionally, CD-R, WORM, DVD-R, and/or DVD+R devices could be included in the plurality storage devices. As an example, the disk storage may implemented with an IBM FAStT 900, and the tape library may be implemented with an IBM 3494 tape library using IBM 3590 drives, all of which are available from IBM Corporation. In another example, one or more of the storage devices could be implemented with a model 2105 Enterprise Storage Server, available from IBM Corporation. Each storage device 120a-c, 122a-c may be coupled to the server 110 using, for example, Fibre Channel or SCSI protocol.

Figure 2:
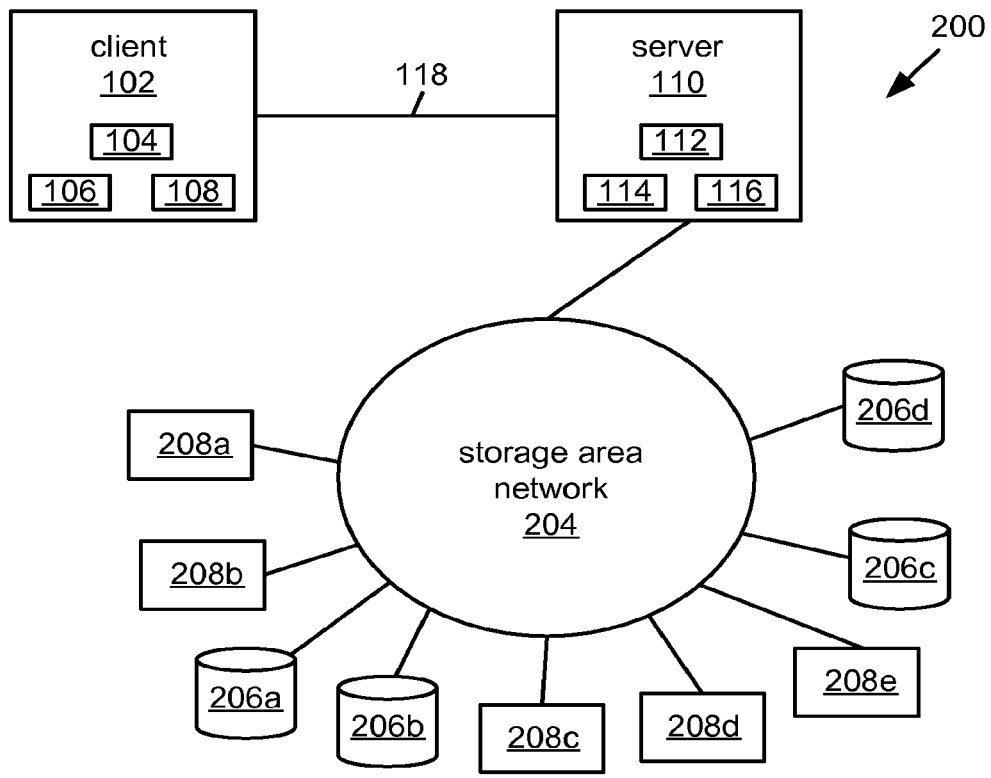
FIG. 2 is a block diagram of the hardware components and interconnections of a computing system in accordance with another example of the invention.

Referring to FIG. 2, the computing system may alternatively be embodied by all, or portions of, the computing system 200. As in the computing system 100 in FIG. 1, the computing system 200 in FIG. 2 includes the client 102, the server 110, and the connection 118. In contrast to the computing system 100 in FIG. 1, in the computing system 200 in FIG. 2 the plurality of storage devices 206a-d, 208a-e are coupled to the server 110 through a storage area network (SAN) 204. The plurality of storage devices may include, for example, hard drives 206a-d, and tape drives 208a-e, and may include any of the types of storage devices discussed above with regard to the computing system 100 in FIG. 1. Using the storage area network 204 permits coupling a large number of storage devices to the server 110. As an example, the storage area network 204 may be implemented using Fibre Channel network(s) and/or Ethernet network(s). The invention need not be implemented with a storage area network, and may be implemented with directly attached storage, as shown in FIG. 1, wherein the plurality of storage devices are coupled directly to the server 110.

In another example, the computing system could be implemented with a storage area network and the architecture for the Storage Tank file system and storage management system (not shown), which is available from IBM Corporation.

II. Operation

In addition to the hardware embodiments described above, another aspect of the invention concerns a method for error tracking

A. Signal-Bearing Media

Figure 3:
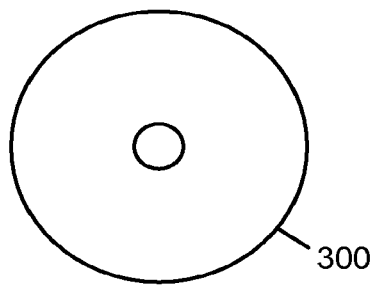
FIG. 3 is an example of a signal-bearing medium in accordance an example of the invention.

In the context of FIGS. 1 and 2, the method aspect of the invention may be implemented, for example, by having the server 110, execute a sequence of machine-readable instructions, which can also be referred to as code. These instructions may reside in various types of signal-bearing media. In this respect, one aspect of the present invention concerns a programmed product, comprising a signal-bearing medium or signal-bearing media tangibly embodying a program of machine-readable instructions executable by a digital processing apparatus to perform a method for error tracking This signal-bearing medium may comprise, for example, primary memory 114 and/or non-volatile memory 116. Alternatively, the instructions may be embodied in a signal-bearing medium such as the optical data storage disc 300 shown in FIG. 3. The optical disc can be any type of signal bearing disc or disk, for example, a CD-ROM, CD-R, CD-RW, WORM, DVD-R, DVD+R, DVD-RW, or DVD+RW. Additionally, whether contained in the computing system 100, the computing system 200, or elsewhere, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C++".

B. Overall Sequence of Operation

Figure 4A:
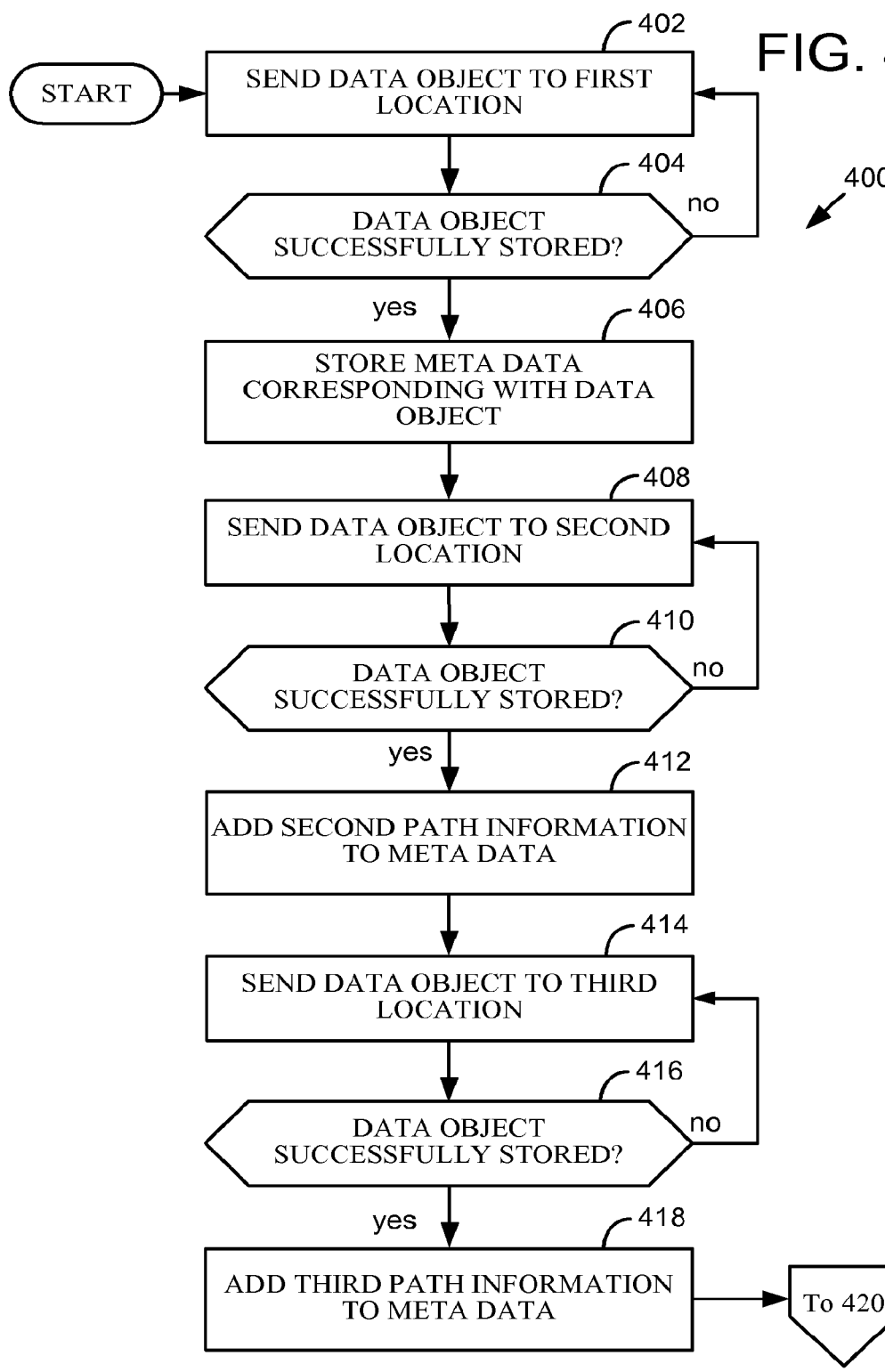

For ease of explanation, but without any intended limitation, the method aspect of the invention is described with reference to the computing system 100 described above and shown in FIG. 1, and the computing system 200 described above and shown in FIG. 2. An example of the method aspect of the present invention is illustrated in FIGS. 4A and 4B, which show a sequence 400 for a method for error tracking. As an example, the operations in the sequence 400 may be performed by the server 100 in conjunction with the storage devices 206a-d, 208a-e. Referring to FIG. 4A, the sequence 400 may include, and begin with, operation 402 which comprises sending a data object to a first location. Operating 402 may comprise attempting to store the data object at the first location. As an example, the first location may be in a pool of disks coupled to a server such as the server 100. In another example, the first location may be in any storage device 206a-d, 208a-e in the storage area network 204. As a specific example, the data object may be stored in one of a Tivoli Storage Manager server's disks. The sequence may also include operation 404 which comprises determining if the data object was successfully stored at the first location. If in operation 404 it is determined that the data object was not successfully stored at the first location, then operation 402 may be repeated. If it is determined in operation 404 that the data object was successfully stored at the first location, the sequence 400 may also include operation 406, which comprises storing meta data corresponding with the data object, wherein the meta data includes first path information. Although not required, this meta data is typically stored in a database. As an example, the meta data may be stored in the non volatile memory 116. The first path information may include a date and time that the data object was stored (or, for example, a time identifier, a time code, a time stamp, or other number or identifier). The first path information may also include a source identifier and/or a destination identifier. The first path information may also include information that identifies hardware devices that are in the data path of the data object between the source and the destination, for example, intermediary host bus adapters (HBAs), routers, and switches. A host bus adapter functions as a network adapter for networks, and may translate, for example, SCSI or Fibre Channel.

Thus, some examples of the invention may identify the date and time, source, target devices, and/or the data path of a data object when a data object is transferred, and then store that information as part of meta data for the object. Each time the data object is transferred, the new time and device information may be updated and appended to the meta data. Tracking the complete history provides flexibility and usefulness, and possibly could be utilized in other computing environments.

The sequence 400 may also include operation 408, which comprises sending the data object to a second location. As an example, the data object may be sent from the first location to the second location. Operation 408 may comprise attempting to store the data object at the second location. As an example, the second location may be on any storage device 206a-d, 208a-e in the storage area network 204. The operation 408 of sending the data object to the second location may comprise attempting to migrate the data object to tape, which, as an example, may be the case if the data object was first stored on a hard disk. The sequence 400 may also include operation 410, which comprises determining if the data object was successfully stored at the second location. If in operation 410 it is determined that the data object was not successfully stored at the second location, then operation 408 may be repeated. If in operation 410 it is determined that the data object was successfully stored at the second location, then the sequence 400 may also include operation 412, which comprises adding (which may comprise appending or pre-pending), second path information to the meta data corresponding with the data object, to update the meta data. The second path information may include a date and time that the data object was stored at the second location (or, for example, a time code or other number). The second path information may also include a source identifier and/or a destination identifier. As an example, the source may be the first location. The second path information may also include information that identifies hardware devices that are in the data path of the data object between the source and the destination, for example, intermediary host bus adapters (HBAs), routers, and switches.

The sequence 400 may also include operation 414, which comprises sending the data object to a third location. Operation 414 may comprise attempting to store the data object at the third location. As an example, the third location may be on any storage device 206*a-d*, 208*a-e* in the storage area network 204. The sequence 400 may also include operation 416, which comprises determining if the data object was successfully stored at the third location. If in operation 416 it is determined that the data object was not successfully stored at the third location, then operation 414 may be repeated. If in operation 416 it is determined that the data object was successfully stored at the third location, then the sequence 400 may also include operation 418, which comprises adding third path information to the meta data corresponding with the data object, to update the meta data. The operations of attempting to store the data object at another location, and determining whether the data object was successfully stored, and adding additional path information to the meta data corresponding with the data object, may be repeated as many times as desired. The third path information may include a date and time that the data object was stored at the third location (or, for example, a time code or other number). The third path information may also include a source identifier and/or a destination identifier. As an example, the source may be the second location. The third path information may also include information that identifies hardware devices that are in the data path of the data object between the source and the destination, such as for example intermediary host bus adapters (HBAs), routers, and switches.

In an alternative example, the sequence 400 may comprise sending a data object to a plurality of locations at substantially the same time, for example, to a first location and a second location at substantially the same time. This may be described as simultaneously writing a data object to a plurality of devices. The sequence 400 may also comprise determining if the data object was successfully stored at the first location and the second location, and if so, storing in a single meta data record, meta data corresponding with the data object, wherein the meta data comprises first path information including a first source identifier, a first destination identifier, and a second destination identifier. Alternatively, the sequence 400 may comprise determining if the data object was successfully stored at the first location, and if so, storing in a single meta data record, meta data corresponding with the data object, wherein the meta data includes first path information comprising a first source identifier and a first destination identifier, and, determining if the data object was successfully stored at the second location, and if so, also storing in the single meta data record, additional meta data corresponding with the data object, wherein the additional meta data includes additional first path information comprising a second destination identifier. As an example, the first path information may further comprise a first time identifier. The sequence 400 may also comprise sending the data object from the first location to a third location. The sequence 400 may also comprise determining if the data object was successfully stored at the third location, and if so, adding second path information to the meta data corresponding with the data object, to update the meta data. As an example, the second path information may comprise a second source identifier, a third destination identifier, and a second time identifier.

In another alternative example, the sequence 400 may comprise sending a data object to a first location, a second location, and a third location at substantially the same time. As an example, the first location may be in a disk array, the second location may be a first tape library and the third location may be a second tape library. The sequence 400 may also comprise determining if the data object was successfully stored at the first location, and if so, storing in a single meta data record, meta data corresponding with the data object, wherein the meta data includes first path information comprising a first source identifier and a first destination identifier. The sequence 400 may further comprise determining if the data object was successfully stored at the second location, and if so, also storing in the single meta data record, first additional meta data corresponding with the data object, wherein the first additional meta data includes additional first path information comprising a second destination identifier. The sequence 400 may additionally comprise determining if the data object was successfully stored at the third location, and if so, also storing in the single meta data record, second additional meta data corresponding with the data object, wherein the second additional meta data includes additional first path information comprising a third destination identifier. The sequence 400 may also comprise sending the data object from the first location to a fourth location. The sequence 400 may further comprise determining if the data object was successfully stored at the fourth location, and if so, adding second path information to the meta data corresponding with the data object, to update the meta data. As an example, the first path information may further comprise a first time identifier, and the second path information may comprise a second source identifier, a fourth destination identifier, and second time identifier.

The sequence 400 may also include operation 420, which comprises detecting that the data object is corrupted, (which may be also be described as determining whether the data object is corrupted). In some cases the data corruption may not be discovered until after attempting to restore the data object from a backup copy of data, and error logs may be lost by the time the data error is discovered. As an example, the operation of detecting that the data object is corrupted may comprise examining a CRC base in the data, or could comprise using other data validation methods. A CRC base may be embedded in the data. An error is present if the CRC base does not match. After detecting that the data object is corrupted, the sequence may also include operations 422, 424, 426, 428, and 430, which are described below.

The sequence 400 may include operation 422, which comprises searching for an uncorrupted copy of the corrupted data object. Device histories may be compared to determine the degree of confidence in a copy of a data object. As an example, if the device histories are the same, then a copy of the data object is suspect. If the device histories are completely different, then there is a greater chance that the copy of the data object is not corrupted. The sequence 400 may also include operation 424, which comprises analyzing error logs for all devices included in the meta data for the corrupted data object. The sequence 400 may also include operation 426, which comprises identifying all devices included in the meta data for the corrupted data object, which indicate an error in their error log. The sequence may also include operation 428, which comprises searching meta data corresponding with an additional data object to determine if any device in the meta data for the corrupted data object that has an error in its error log is included in the meta data corresponding with the additional data object. If in operation 428 it is determined that a device that has an error in its error log is included in the meta data corresponding with the additional data object, then the sequence 400 may also include operation 430, which comprises analyzing the additional data object to try to determine if the additional data object is corrupted.

Prior to the invention, there was no easy way to identify which devices in a computing system handled which data objects. Consequently, it was very difficult to determine which device caused a data error. Generally, it is very difficult and time consuming to examine every device in a storage area network. To avoid this problem, some examples of the invention focus on the data path, and track which specific devices and hardware paths a data object passes through while it is being stored. With some examples of the invention, the path of a data object is tracked through the computing system, and information indicating which devices have "touched" the data object are stored in meta data. Some examples of the invention limit the search for defective devices, because the hardware paths, devices, and time that data is handled, is tracked, thereby providing a clearer trail to follow for problem determination and data recovery. If an unreported error occurs during the transfer of a data object, devices whose error logs are candidates for being examined can quickly be identified by using the information in the meta data. Thus, some examples of the invention facilitate quickly identifying failed hardware and/or software components causing data corruption. The history of data objects may be tracked across an entire storage subsystem, from application to end point, thereby providing a systematic view of an operation, and devices used to perform the operation. In addition, because the time window of an error is known, it is possible to identify other data objects that may also have been adversely affected. This set of data objects may be audited to determine whether additional recovery is needed. With some examples of the invention, problem analysis is reduced to a fixed set of devices in a window of time, correlations can be better drawn if multiple files fail to restore, and further, predictive capability is gained for identifying other suspect data objects. The invention may be called a data centric error tracking and problem analysis method (and system), because the error tracking is based on the path traveled by the data.

This method of maintaining the history for each creation and copy of a file provides a complete history of the data movement. If an error occurs while reading a file, the path history can be viewed for pinpointing the time periods to investigate. The investigation can then focus on relevant device error logs, software or hardware changes, and/or other storage area network events that could have happened in that window of time. In some examples, error logs are examined only for a window of time beginning when an uncorrupted version of a data object is last stored, and ending at the time that a corrupted version of the data object is first stored. After the source of the data corruption is identified, proactive steps can be taken to disable defective devices and to evaluate other data for corruption and to determine whether the corruption is pervasive or isolated to a specific timing window. Other measures, for example CRC checking, can reduce the number of data transfers to investigate, but not all environments will be able to support those measures. Additionally, it is possible to use the complete history of the data movement as a level of redundancy if the checking algorithms are not completely trusted.

As an example, the invention may be implemented in Tivoli Storage Manager, which is a backup data recovery product that is available from IBM Corporation. Tivoli Storage Manager includes a backup server and a library or database of meta data for data objects, and may be used with a storage area network. A Tivoli Storage Manager server uses storage area networks to provide data storage services to its clients for backup, archive, or space management of data. A Tivoli Storage Manager client relies on the Tivoli Storage Manager server to store files for safe keeping. Additionally, the invention is also applicable to SCSI environments, Fibre Channel environments, and other data management products.

The following are examples of how some embodiments of the invention may provide a history of data and its paths. Three separate cases are considered: initial creation, object copy for redundant backup, and object migration. Although in these examples only the time, source drive, and destination drives, are tracked, the method may be extended to include any hardware elements in the data path (such as HBA's, routers, etc.), as long as that information is available to the software application.

(Initial Case) Using Tivoli Storage Manager, a client stores FILE1 to a tape drive, DRIVE1, on a tape, TAPE1, on Jan. 3, 2003. If the store is successful, meta-data about FILE1 is stored in the database. The following path information is included in the meta-data for FILE1:

01/03/2004, 14:05, DRIVE1, TAPE1.

(Copy case) Later on the same day, a copy of FILE1 is made for disaster recovery purposes using DRIVE2 as the source drive and DRIVE3 as the target drive, and tape COPYTAPE1. Meta-data for the copy of FILE1 is stored in the database along with its path information as follows:

01/03/2004, 14:05, DRIVE1, TAPE1; Jan. 3, 2003, 15:00, DRIVE2,DRIVE3,COPYTAPE1. This meta data shows that on Jan. 3, 2003 at 14:05 this object was created using DRIVE1/TAPE1. On January 3, a copy was created at 15:00 and stored on COPYTAPE1 using DRIVE2 as the source device and using DRIVE3 as the target device.

(Migration case) Two weeks later, FILE 1 is migrated (moved) from TAPE 1 to TAPE3 using DRIVE1 as the source, and DRIVE2 as the target. The meta-data stored looks like this:

01/03/2004, 14:05, DRIVE1, TAPE1; Jan. 17, 2003, 10:00, DRIVE1,DRIVE2,TAPE3. This meta data shows that the file was originally stored January 3 on TAPE 1 using DRIVE1. Then on January 17 at 10:00 the file was moved to TAPE3 using DRIVE2, reading from DRIVE1.

If corrupted data is discovered and a defective device is identified, the defective device may be replaced to prevent further data errors. As a hypothetical example, on Mar. 1, 2003, a file on TAPE3 is read, and is found to be corrupt. The history of the corrupt file is examined, which reveals that a copy of the file was created on Jan. 1, 2003, and that the copy made at that time was not corrupted. Further examination of a hardware log for DRIVE2 reveals that there were bus errors at the time the file was moved. In response, DRIVE2 is replaced to prevent further corruption of data.

III. Other Embodiments

While the fore going disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

The invention claimed is:

1. A machine readable storage device comprising at least one of a magnetic storage device and an electronic memory device having machine-readable instructions executed by a server, in communication with a plurality of clients, a first storage device, and a second storage device, to perform operations, the operations comprising:
   providing data storage services for the clients for backup of data objects from the clients;
   sending a data object to a first location in the first storage device;
   determining if the data object was successfully stored at the first location, and if so, storing meta data corresponding with the data object, wherein the meta data includes first path information on a first data path of the data object from a source location to the first location, wherein the first path information indicates at least one device in the first data path between the source location and the first location;

migrating the data object from the first location to a second location in the second storage device; and determining if the data object was successfully stored at the second location, and if so, adding second path information on a second data path of the data object from the first location to the second location to the meta data corresponding with the data object, to update the meta data, wherein the second path information indicates at least one device in the second data path between the first location and the second location.

2. The machine readable storage device of claim 1, wherein the server provides data storage services for the clients at the first and the second storage devices in a storage area network.

3. The machine readable storage device of claim 1, wherein the first and the second storage devices comprise different storage media, and wherein the data object is migrated to the second location by migrating the data object to tape.

4. The machine readable storage device of claim 1, wherein the metadata indicates a data path to track the storage devices and hardware paths through which a data object passes while being stored at the first and the second locations.

5. The machine readable storage device of claim 4, wherein the metadata further tracks a time at which the data object was located at the first and the second locations.

6. The machine readable storage device of claim 1, wherein the operations further comprise:
   updating the metadata for the object indicating new additional path information, including device information, in response to performing an additional transfer of the data object.

7. A computing system in communication with a first storage device, a second storage device and a plurality of clients, comprising:
   a machine readable storage medium, comprising at least one of a magnetic storage device and an electronic memory device, including computer instructions; and
   a processing device coupled to the machine readable storage medium to execute the computer instructions to perform error tracking operations, the operations comprising:
      providing data storage services for the clients for backup of data objects from the clients;
      sending a data object to a first location in the first storage device;
      determining if the data object was successfully stored at the first location, and if so, storing meta data corresponding with the data object, wherein the meta data includes first path information on a first data path of the data object from a source location to the first location, wherein the first path information indicates at least one device in the first data path between the source location and the first location;
      migrating the data object from the first location to a second location in the second storage device; and
      determining if the data object was successfully stored at the second location, and if so, adding second path information on a second data path of the data object from the first location to the second location to the meta data corresponding with the data object, to update the meta data, wherein the second path information indicates at least one device in the second data path between the first location and the second location.

8. The computing system of claim 7, wherein the server provides data storage services for the clients at the storage devices in a storage area network.

9. The computing system of claim 7, wherein the first and the second storage devices comprise different storage media, and wherein the data object is migrated to the second location by migrating the data object to tape.

10. The computing system of claim 7, wherein the metadata indicates a data path to track the storage devices and hardware paths through which a data object passes while being stored at the first and the second locations.

11. The computing system of claim 10, wherein the metadata further tracks a time at which the data object was located at the first and the second locations.

12. The computing system of claim 7, wherein the operations further comprise:
   updating the metadata for the object indicating new additional path information, including device information, in response to performing an additional transfer of the data object.

13. A method for performing error checking operations, comprising:
   providing data storage services for clients for backup of data objects from the clients;
   sending a data object to a first location in a first storage device;
   determining if the data object was successfully stored at the first location, and if so, storing meta data corresponding with the data object, wherein the meta data includes first path information on a first data path of the data object from a source location to the first location, wherein the first path information indicates at least one device in the first data path between the source location and the first location;
   migrating the data object from the first location to a second location in a second storage device of the storage devices, wherein the first and the second storage devices comprise different storage media; and
   determining if the data object was successfully stored at the second location, and if so, adding second path information on a second data path of the data object from the first location to the second location to the meta data corresponding with the data object, to update the meta data, wherein the second path information indicates at least one device in the second data path between the first location and the second location.

14. The method of claim 13, wherein data storage services are provided for the clients at the first and the second storage devices in a storage area network.

15. The method of claim 13, wherein the first and the second storage devices comprise different storage media, and wherein the data object is migrated to the second location by migrating the data object to tape.

16. The method of claim 13, wherein the metadata indicates a data path to track the first and the second storage devices and hardware paths through which a data object passes while being stored at the first and the second locations.

17. The method of claim 16, wherein the metadata further tracks a time at which the data object was located at the first and second locations.

18. The method of claim 13, wherein the operations further comprise:
   updating the metadata for the object indicating new additional path information, including device information, in response to performing an additional transfer of the data object.

* * * * *